United States Patent
Lin

(10) Patent No.: US 7,134,697 B2
(45) Date of Patent: Nov. 14, 2006

(54) 360° ROTATABLE INLET SCREW ASSEMBLY FOR A PNEUMATIC TOOL

(75) Inventor: Ming-Chiuan Lin, Taichung (TW)

(73) Assignee: Basso Industry Corp., Taichung (TW)

( * ) Notice: Subject to any disclaimer, the term of this patent is extended or adjusted under 35 U.S.C. 154(b) by 203 days.

(21) Appl. No.: 10/910,698

(22) Filed: Aug. 3, 2004

(65) Prior Publication Data

US 2006/0028021 A1 Feb. 9, 2006

(51) Int. Cl.
*F16L 27/00* (2006.01)
*B24B 45/04* (2006.01)

(52) U.S. Cl. ............ 285/276; 285/278; 285/280; 285/281; 173/168; 173/169

(58) Field of Classification Search ............ 285/272, 285/275, 276, 278, 280, 281; 173/168, 169
See application file for complete search history.

(56) References Cited

U.S. PATENT DOCUMENTS

| | | | | |
|---|---|---|---|---|
| 1,230,606 A * | 6/1917 | Saunders | ............ | 285/280 |
| 2,021,241 A * | 11/1935 | Mall | ............ | 285/276 |
| 2,362,608 A * | 11/1944 | Allen | ............ | 251/229 |
| RE27,207 E * | 10/1971 | Ramspeck | ............ | 91/356 |
| 3,832,772 A * | 9/1974 | Sumida | ............ | 30/392 |
| 5,244,185 A * | 9/1993 | Clapp et al. | ............ | 251/321 |
| 5,284,318 A * | 2/1994 | Geiger et al. | ............ | 251/152 |
| 5,687,802 A * | 11/1997 | Spooner et al. | ............ | 173/169 |
| 5,964,302 A * | 10/1999 | Lin | ............ | 173/169 |
| 6,161,627 A * | 12/2000 | Seith et al. | ............ | 173/93.5 |
| 6,443,239 B1 * | 9/2002 | Izumisawa | ............ | 173/169 |
| 6,517,119 B1 * | 2/2003 | Thomas | ............ | 285/276 |
| 6,840,547 B1 * | 1/2005 | Hhiue | ............ | 285/272 |
| 6,991,043 B1 * | 1/2006 | Chen | ............ | 173/169 |
| 2006/0011366 A1 * | 1/2006 | Liao | ............ | 173/169 |

FOREIGN PATENT DOCUMENTS

EP 0 849 052 A2 * 6/1998
WO WO 97/10929 * 3/1997

* cited by examiner

*Primary Examiner*—James M. Hewitt
(74) *Attorney, Agent, or Firm*—Charles E. Baxley

(57) ABSTRACT

A 360° rotatable inlet screw assembly for a pneumatic tool includes a fixing base, an inlet screw and a C-shaped retainer. The fixing base is fixed in an inlet hole of the pneumatic tool and axially formed with a through hole. A first end of the inlet screw is formed with a head portion. An annular groove is formed in the inlet screw and located close to a second end thereof, the second end of the inlet screw passes through the through hole of the fixing base in a manner that the annular groove protrudes out of the through hole of the fixing base. The C-shaped retainer in the annular groove of the inlet screw for enabling the inlet screw to be assembled with the fixing base.

3 Claims, 8 Drawing Sheets

360° ROTATABLE INLET SCREW ASSEMBLY FOR A PNEUMATIC TOOL

BACKGROUND OF THE INVENTION

1. Field of the Invention

This invention relates to an inlet screw assembly for a pneumatic tool, and more particularly to a 360° rotatable inlet screw assembly, including a fixing base, an inlet screw and C-shaped retainer. The inlet screw assembly is set in an inlet hole of a pneumatic tool for enabling the inlet screw to rotate relative to the fixing base.

2. Description of the Prior Arts

When in use, the pneumatic tool always needs to be moved to different positions according to needs. Thereby the pneumatic tool is usually equipped with an inlet screw which is rotatable relative to the body of the pneumatic tool in order to improve applicability of the pneumatic tool when the inlet screw is being connected to an air resource.

A conventional rotatable inlet screw assembly for a pneumatic tool 10 is shown in FIGS. 1 and 2, the pneumatic tool 10 is provided with an inlet hole 11 and a positioning hole 12 transversely passing through the inlet hole 11. At a bottom of the pneumatic tool 10 is fixed a vent cap 13, and in the inlet hole 11 is disposed an inlet screw 14. An annular groove 15 and a positioning groove 16 are formed on and located adjacent to a first end of the inlet screw 14, respectively. The first end of the inlet screw 14 with the annular groove 15 and the positioning groove 16 passes through the vent cap 13. An O-shaped ring 17 is set in the annular groove 15, and the positioning groove 16 is aligned to the positioning hole 12 of the pneumatic tool. Then, a spring pin 18 is inserted in the positioning groove 16 of the inlet screw 14 after passing through the positioning hole 12 of the pneumatic tool 10. By such arrangements, the inlet screw 14 is allowed to rotate relative to the spring pin 18 by means of the positioning groove 16.

However, the disadvantages of this conventional inlet screw assembly are not difficult to be found in real application. With reference to FIGS. 3 and 4, since the inlet screw 14 is single-side supported by the spring pin 18 and disposed in the inlet hole 11 of the pneumatic tool 10. When the inlet screw 14 is connected to air supply (not shown), the inlet hole 11 is injected with air and the inner pressure is increased. In this case, the inlet screw 14 will be caused to swing and rotate about the spring pin 18 (which works as a fulcrum). As a result, the spring pin 18 is pressed by the inlet screw 14 and the pressure force is finally exerted on the inner wall of the through hole 11 of the pneumatic tool 10. Thereby, the rotation of the inlet screw 14 relative to the spring pin 18 will be unsmooth.

The present invention has arisen to mitigate and/or obviate the afore-described disadvantages of the conventional rotatable inlet screw assembly of a pneumatic tool.

SUMMARY OF THE INVENTION

The primary object of the present invention is to provide a 360° rotatable inlet screw assembly for a pneumatic, including a fixing base, an inlet screw and a C-shaped retainer. The fixing base is fixed in an inlet hole of the pneumatic tool and axially formed with a through hole. The inlet screw, a first end of which is formed with a head portion, and an annular groove formed on the inlet screw and located close to a second end thereof, the second end of inlet screw with the annular groove passes through the through hole of the fixing base in a manner that the annular groove protrudes out of the through hole of the fixing base; The C-shaped retainer is retained in the annular groove of the inlet screw for enabling the inlet screw to be assembled with the fixing base.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
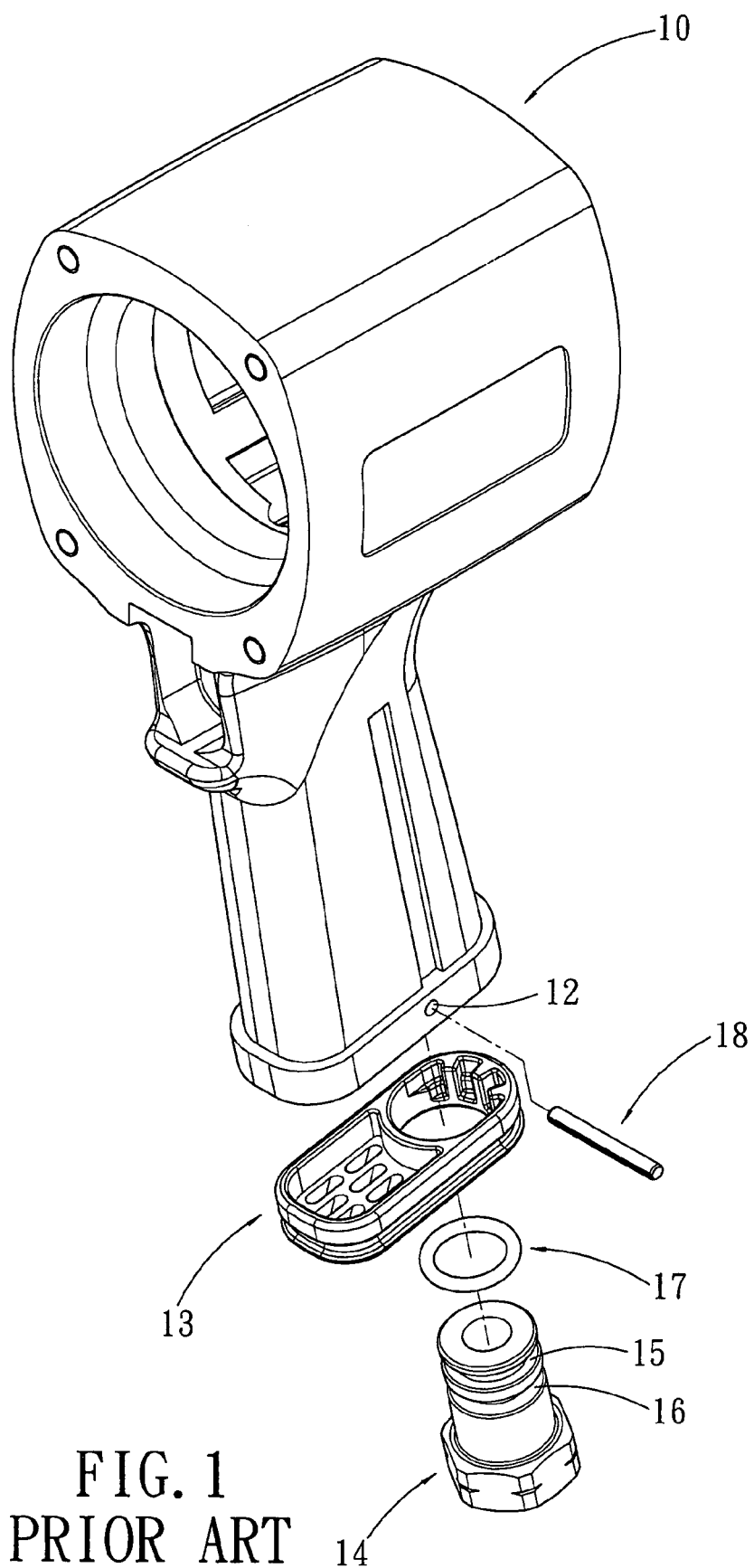
FIG. 1 is an exploded view of a conventional inlet screw assembly for a pneumatic tool.
Figure 2:
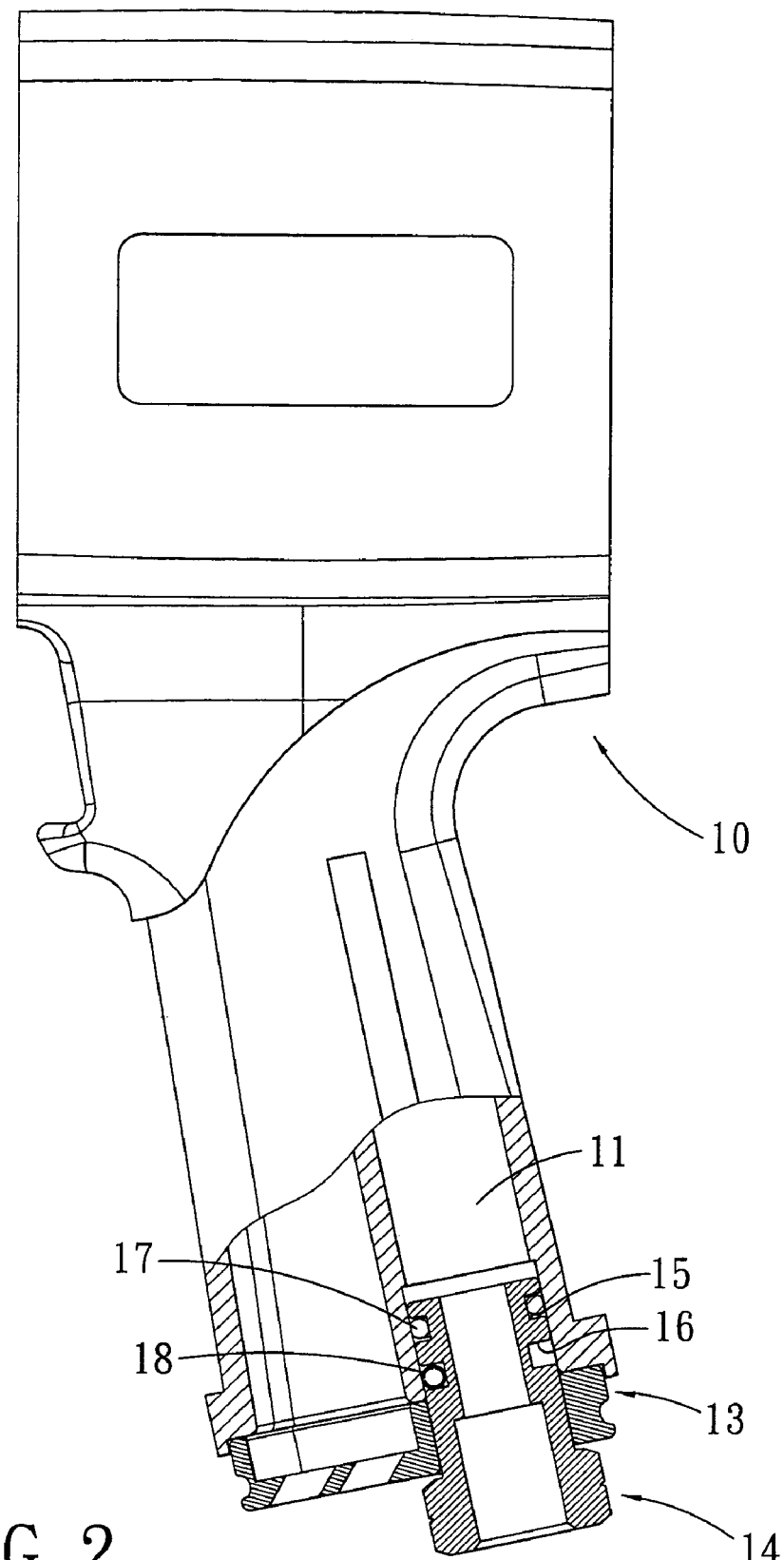
FIG. 2 is an assembly cross sectional view of a conventional inlet screw assembly for a pneumatic tool.
Figure 3:
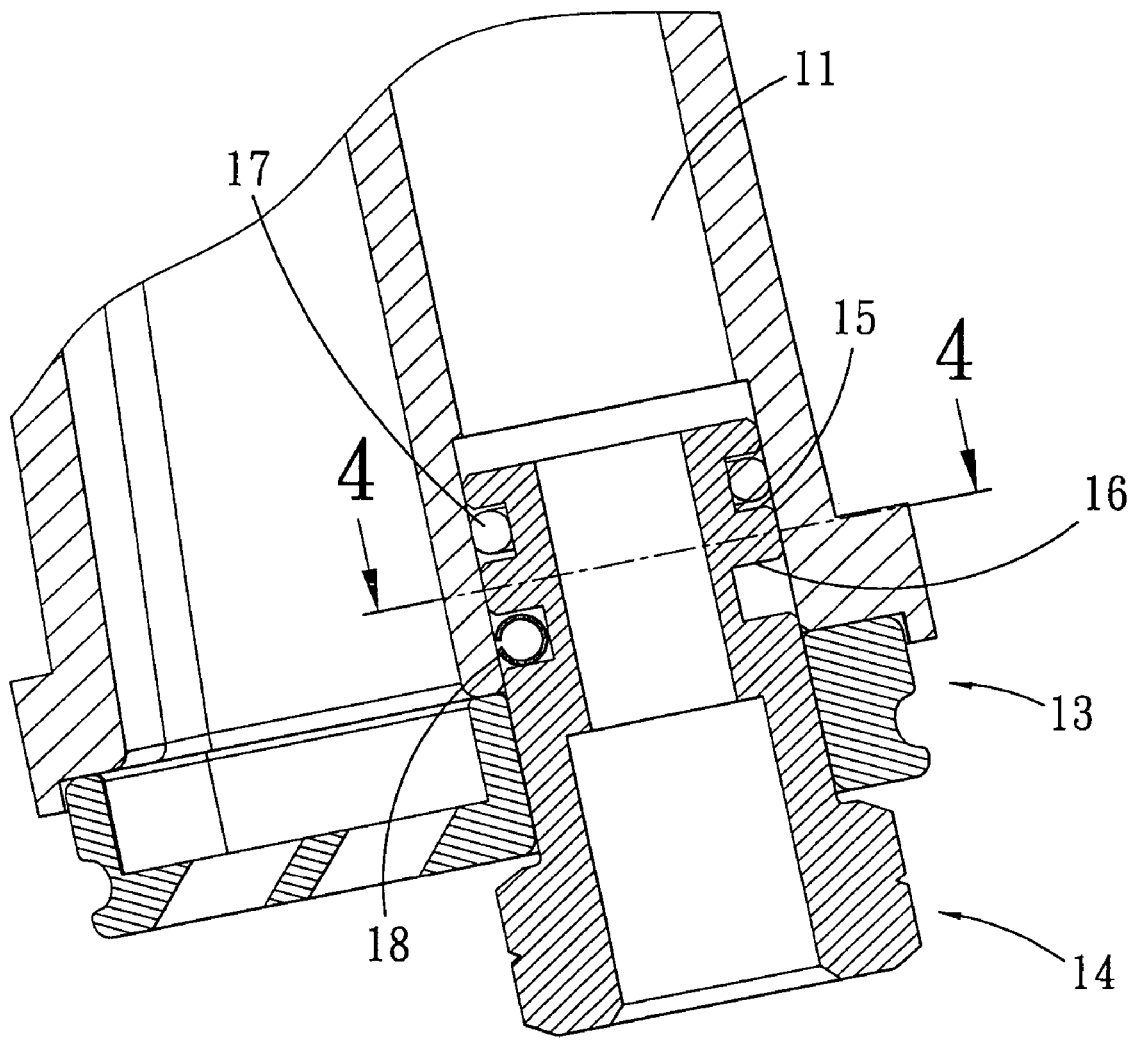
FIG. 3 is a partial amplified view of a conventional inlet screw assembly for a pneumatic tool.
Figure 4:
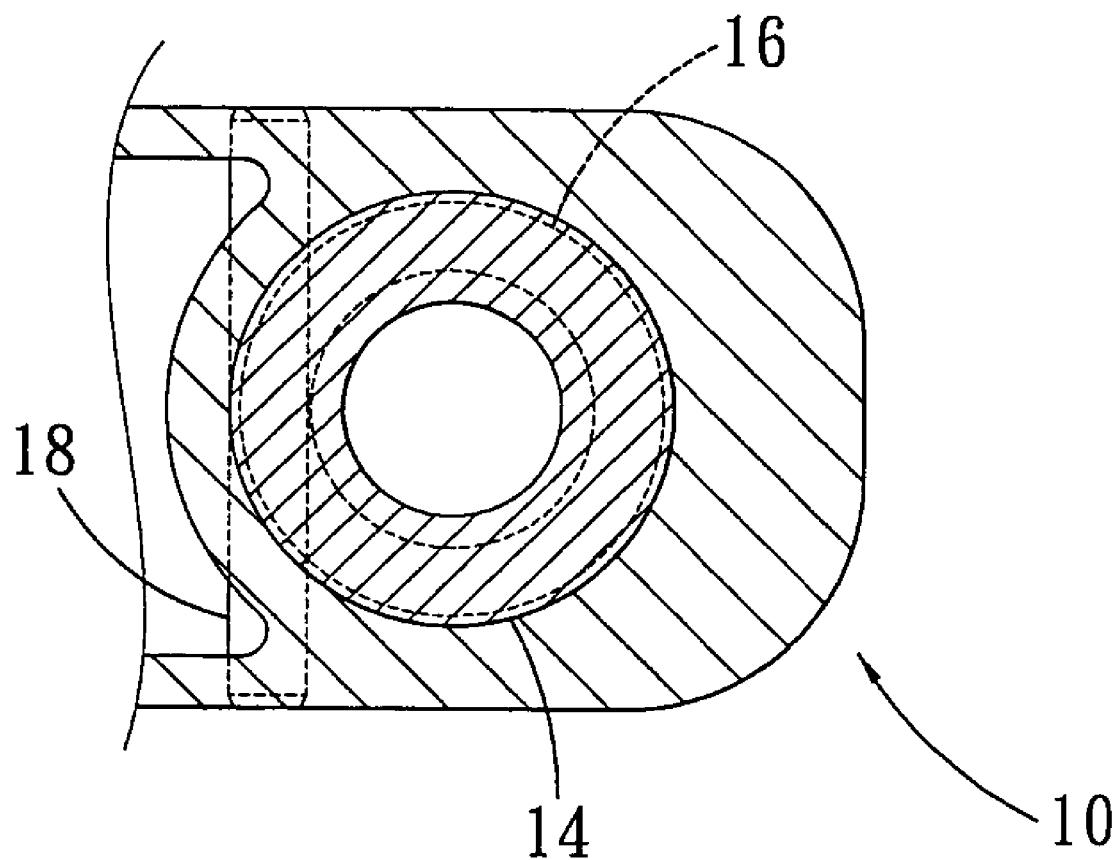
FIG. 4 is a transversal cross sectional view of a conventional inlet screw assembly for a pneumatic tool.
Figure 5:
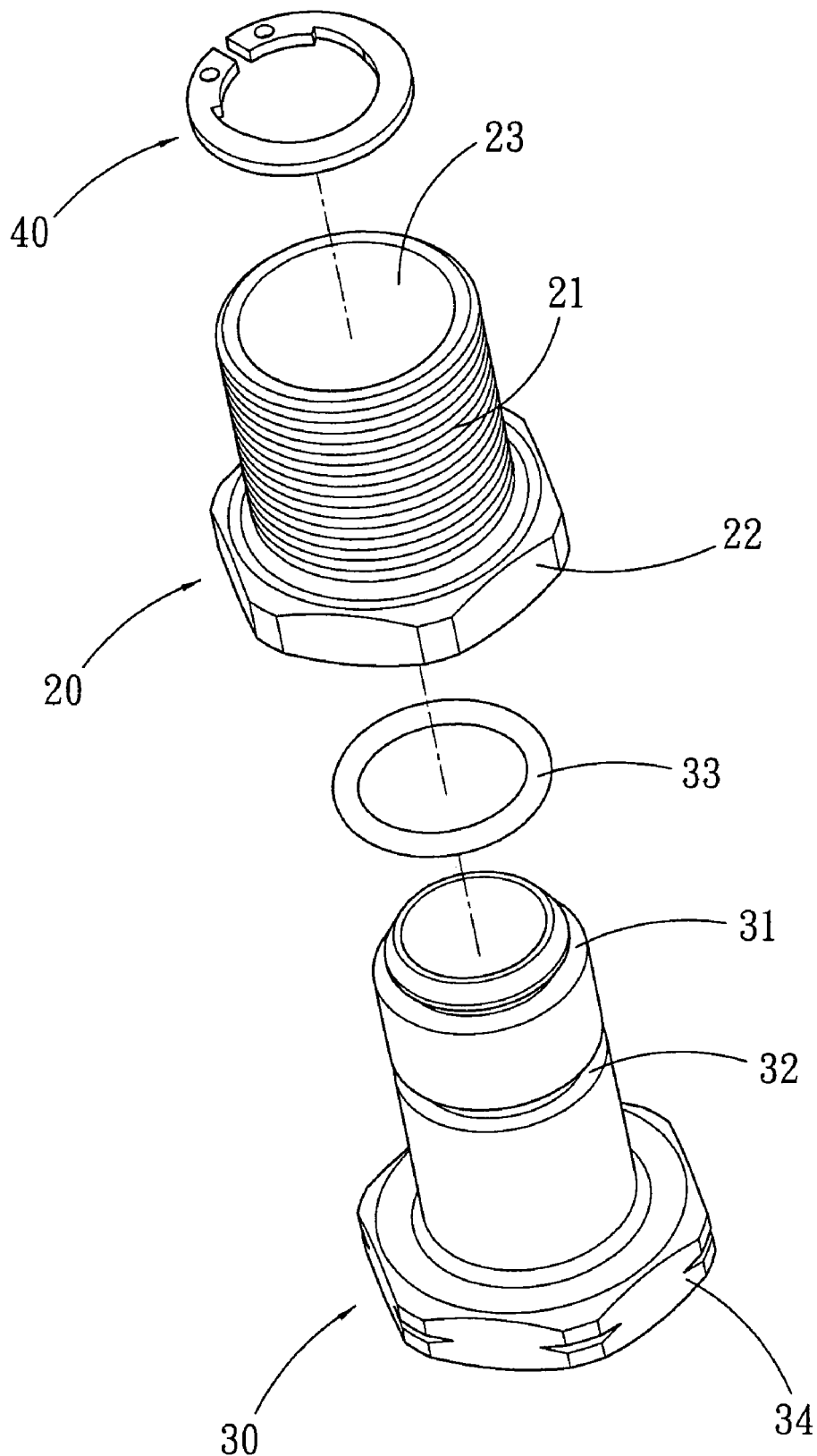
FIG. 5 is an exploded view of a 360° rotatable inlet assembly for a pneumatic tool in accordance with the present invention.
Figure 6:
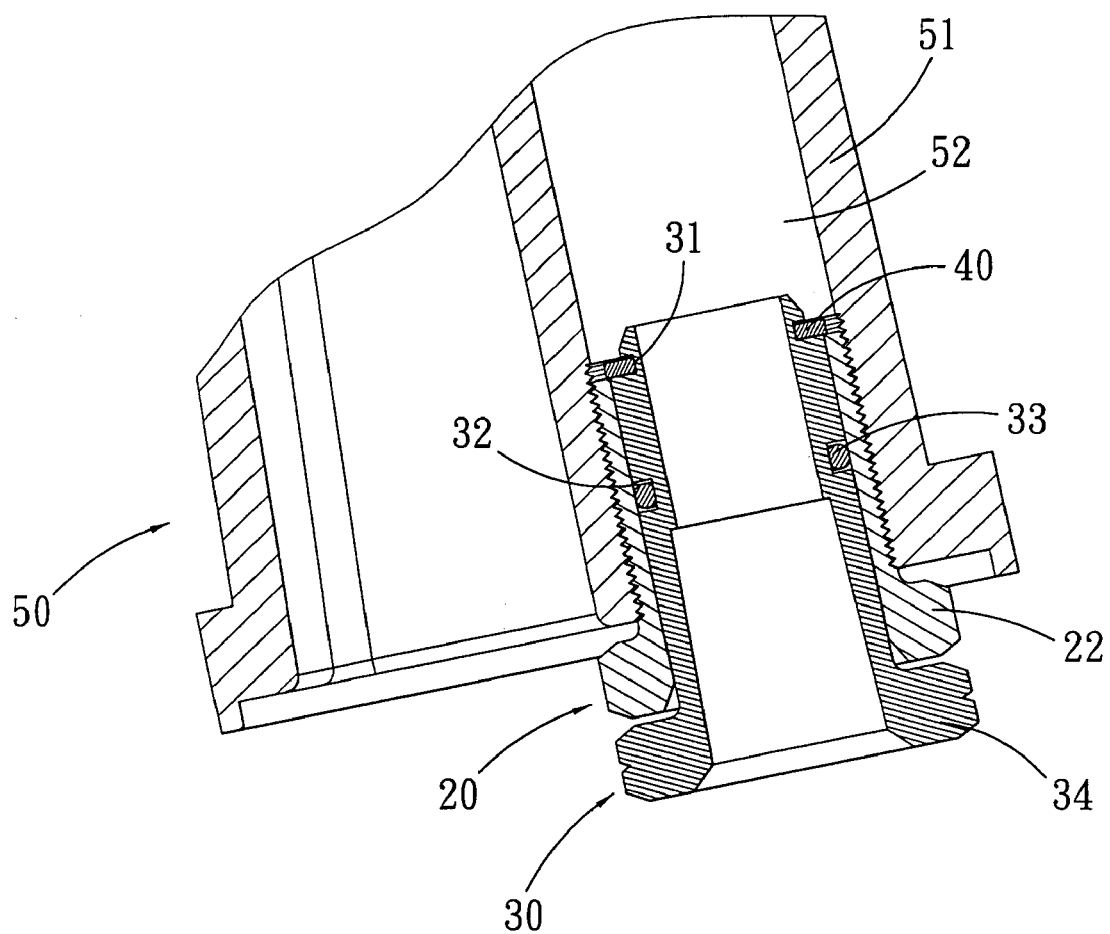
FIG. 6 is an assembly cross sectional view of a 360° rotatable inlet assembly for a pneumatic tool in accordance with the present invention.

Referring to FIGS. 5 and 6, a 360 degree rotatable inlet screw assembly for a pneumatic tool in accordance with a first embodiment of the present invention is shown and generally includes: a fixing base 20, an inlet screw 30 and a C-shaped retainer 40. The rotatable inlet screw assembly is installed in a threaded inlet hole 52 on a handle portion 51 of a pneumatic tool 50.

The fixing base 20 is provided on the outer periphery with threads 21, and at an end of which is formed a head portion 22. The fixing base 20 is screwed in the threaded inlet hole 52 of the pneumatic tool 50 by means of the threads 21 in such a manner that the head portion 22 protrudes out of the inlet hole 52 of the pneumatic tool 50. A through hole 23 is formed on end surface of the head portion 22 and passes through the body of the fixing base 20.

The inlet screw 30, adjacent to a first end of which is annularly formed an annular groove 31. The end of the inlet screw 30 with the annular groove 31 passes through the through hole 23 and protrudes out of the fixing base 20. A dent 32 is annularly formed at a predetermined position on the inlet screw 30 for reception of an O-shaped ring 33. A second end of the inlet screw 30 is a head portion 34 that protrudes out of the through hole 23 of the fixing base 20.

The C-shaped retainer 40 is retained in the annular groove 31 of the inlet screw 30.

As shown in FIGS. 5 and 6, in which, the end of the inlet screw 30 with the annular groove 31 initially passes through the through hole 23 of the fixing base 20 to make the annular groove 31 protrude out of the through hole 23. The C-shaped retainer 40 is set in the annular groove 31, so that the threads 21 of the fixing base 20 is screwed in the inlet hole 52 on the handle portion 51 of the pneumatic tool 50. Through this way, the inlet screw 30 is allowed to rotate relative to the fixing base 20 and the pneumatic tool 50.

The inlet hole 52 of the pneumatic tool 50 is injected with air when the head portion 34 of the inlet screw 30 is connected to air supply (not shown). The inner pressure of the through hole is increased and will be affected on the C-shaped retainer 40. Since the C-shaped retainer 40 contacts the end surface of the fixing base 20 and the inner wall of the annular groove 31 of the inlet screw 30 with its end surface (surface-contact), so that the stress of the C-shaped retainer 40 can be evenly and smoothly exerted on the end surface of the fixing base 20 and on the inner wall of the annular groove 31 of the inlet screw 30. As a result, the inlet screw 30 is allowed to smoothly rotate with relative to the fixing base 20. And thus, the problems of single-sided swing and the unsmooth rotation caused by the conventional inlet screw assembly are eliminated.

In addition, the groove 32 of the inlet screw assembly 30 is received with the O-shaped ring 33 that contacts the inner wall of the through hole 23 of the fixing base 20. This structural design prevents air leakage from the space between the fixing base 20 and the inlet screw 30.

Figure 7:
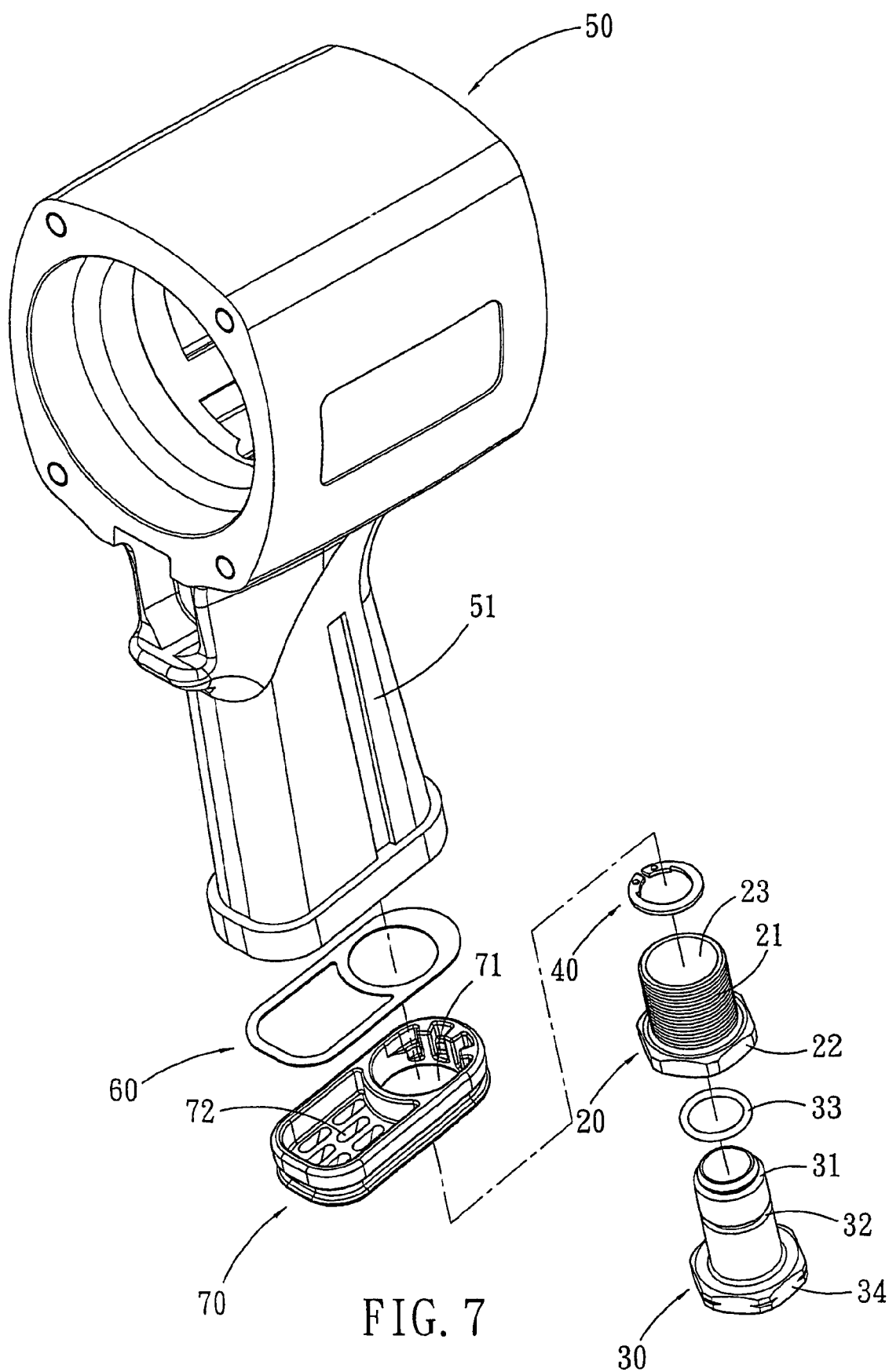
FIG. 7 is an exploded view of a 360° rotatable inlet assembly for a pneumatic tool in accordance with another embodiment of the present invention.
Figure 8:
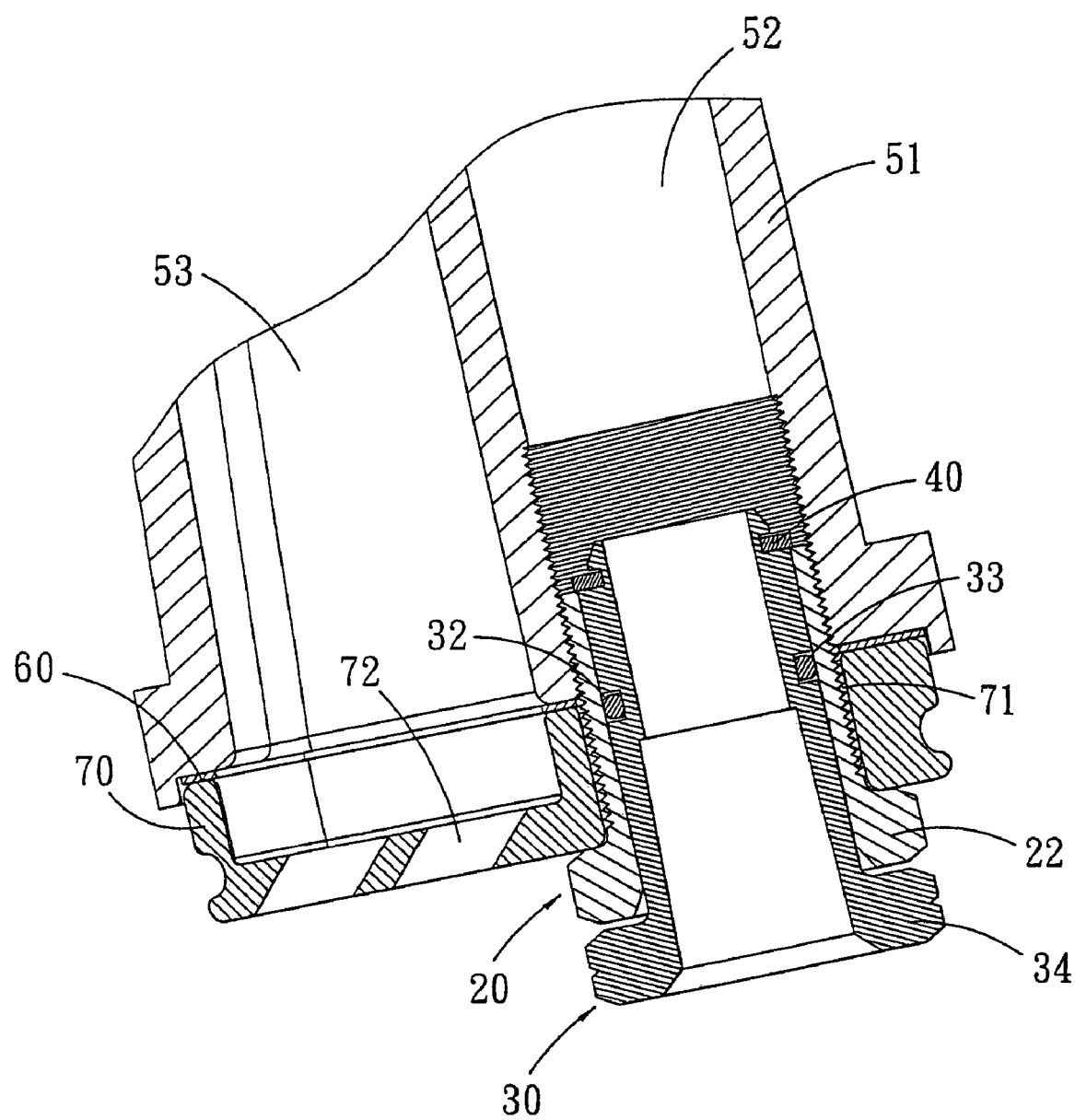
FIG. 8 is an assembly cross sectional view of a 360° rotatable inlet assembly for a pneumatic tool in accordance with another embodiment of the present invention.

Referring to FIGS. 7 and 8, to improve the effect of air-tightness between the pneumatic tool 50 and the fixing base 20, an impervious cushion 60 and a vent cap 70 are sequentially assembled to the bottom of the handle portion 51 of the pneumatic tool 50. The vent cap 70 is provided with an inlet 71 which corresponds to the inlet hole 52 of the pneumatic tool 50. By passing through the inlet 71 of the vent cap 70, the fixing base 20 is screwed in the threaded inlet hole 52 of the handle portion 51. The impervious cushion 60 and the vent cap 70 are designed to prevent air leakage from the clearance between the inlet hole 52 of the pneumatic tool 50 and the fixing base 20, and to prevent the air leakage from the clearance between the handle portion 51 of the pneumatic tool 50 and the vent cap 70 when air is being exhausted from the through hole 53. Thus, the air can be completely exhausted out through vent apertures 72 of the vent cap 70.

While we have shown and described various embodiments in accordance with the present invention, it should be clear to those skilled in the art that further embodiments may be made without departing from the scope of the present invention.

What is claimed is:

1. A pneumatic tool 360° rotatable inlet screw assembly comprising:
   a pneumatic tool:
   a fixing base fixed in an inlet hole of the pneumatic tool, the fixing base axially formed with a through hole;
   an inlet screw, a first end of which is formed with a head portion, and an annular groove formed on the inlet screw and located close to a second end thereof, the second end of the inlet screw with the annular groove passing through the through hole of the fixing base in a manner that the annular groove protrudes out of the through hole of the fixing base;
   a C-shaped retainer retained in the annular groove of the inlet screw for enabling the inlet screw to be assembled with the fixing base.

2. The 360° rotatable inlet screw assembly as claimed in claim 1, wherein the inlet screw is further annularly provided on outer periphery thereof with a groove for reception of an O-shaped ring, which contacts an inner wall of the through hole of the fixing base to prevent air leakage between the fixing base and the inlet screw.

3. The 360° rotatable inlet screw assembly as claimed in claim 1, wherein an impervious cushion and a vent cap are sequentially disposed at a mouth of the inlet hole of the pneumatic tool, the vent cap is provided with an inlet corresponding to the inlet hole of the pneumatic tool, the fixing base is fixed in the inlet hole of the pneumatic tool by passing through the inlet of the vent cap, and with cooperation of the impervious cushion, the vent cap and the fixing base, air-leakage can be prevented from clearance between the inlet hole of the pneumatic tool and the fixing base.

* * * * *